(12) United States Patent
Wallach

(10) Patent No.: US 8,126,921 B2
(45) Date of Patent: Feb. 28, 2012

(54) SYSTEM AND METHOD OF TRANSFERRING INFORMATION

(75) Inventor: Benjamin T. Wallach, Montgomery, AL (US)

(73) Assignee: Regions Asset Company, Wilmington, DE (US)

( * ) Notice: Subject to any disclaimer, the term of this patent is extended or adjusted under 35 U.S.C. 154(b) by 285 days.

(21) Appl. No.: 11/245,111

(22) Filed: Oct. 7, 2005

(65) Prior Publication Data

US 2006/0031166 A1      Feb. 9, 2006

Related U.S. Application Data

(60) Provisional application No. 60/719,581, filed on Sep. 23, 2005.

(51) Int. Cl.
*G06F 17/30* (2006.01)
*G06F 7/00* (2006.01)
*G06F 12/00* (2006.01)
*G06F 7/04* (2006.01)

(52) U.S. Cl. ........ 707/785; 707/809; 707/822; 707/827; 726/4; 726/21; 726/28; 726/29; 726/30

(58) Field of Classification Search .................. 707/9, 1, 707/2, 3, 10, 999.102, 999.103, 999.202, 707/999.01, 785, 809, 999.009, 999.001; 713/713; 715/200–277, 513; 705/8, 30, 705/35; 726/4, 21, 28, 29, 30
See application file for complete search history.

(56) References Cited

U.S. PATENT DOCUMENTS

| | | | |
|---|---|---|---|
| 6,941,271 B1* | 9/2005 | Soong | 705/3 |
| 2002/0087506 A1* | 7/2002 | Reddy | 707/1 |
| 2002/0133437 A1* | 9/2002 | Ansley | 705/35 |
| 2003/0182171 A1* | 9/2003 | Vianello | 705/9 |
| 2005/0086529 A1* | 4/2005 | Buchsbaum | 713/201 |
| 2005/0210282 A1* | 9/2005 | Ohmori | 713/200 |
| 2006/0069803 A1* | 3/2006 | Clark et al. | 709/237 |
| 2006/0165040 A1* | 7/2006 | Rathod et al. | 370/335 |
| 2006/0185019 A1* | 8/2006 | Wong | 726/26 |
| 2007/0128899 A1* | 6/2007 | Mayer | 439/152 |
| 2008/0177994 A1* | 7/2008 | Mayer | 713/2 |

OTHER PUBLICATIONS http://www.simpletoolworks.com, Rob Rubin, "Drive Revenue from Online Bill Pay," © 2005, website (last visited May 24, 2006).
http://www.poorva.com/aie/overview.shtml, Advanced Information Extractor, website, (last visited May 16, 2006).
http://www.beanmasters.com/Projects/DataScraper/DataScraper.html, DataScraper, website, (last visited May 16, 2006).
http://www.scrapegoat.com, Data Retrieval, website (last visited May 16, 2006).

(Continued)

*Primary Examiner* — Mohammad Ali
*Assistant Examiner* — Bao Tran
(74) *Attorney, Agent, or Firm* — Steptoe & Johnson LLP

(57) ABSTRACT

A system and method of transferring information comprising an input module configured to receive an access parameter from an entity authorized to provide the access parameter, an access module configured to access a first database or a second database and communicate information from the first database to the second database wherein the information is configured to perform an authorized function. The function can be authorized bill payment. The information to be transferred can include financial information, and can include account information.

28 Claims, 3 Drawing Sheets

OTHER PUBLICATIONS http://www.navyfcu.org/savings_checking/switchkit.html, Checking Switchkit, website, (last visited May 16, 2006).

Easy Switchkit, form, Hingham Institution for Savings, Hingham MA.

DCU Bill Payer Switch Kit, Authorization for Automatic Payment Switch to New Account, form, Digital Federal Credit Union, Marlborough, MA.

Univest Signature Series Switch Kit, form, Univest Corporation, Souderton, PA.

Membership and Account Application, form, Contra Costa Federal Credit Union, Martinez, CA.

http://pressreleases.newspad.com/pr/20052/pr209458.html, Prasum Communications Introduces RapidIO® SwitchKit™, website, (last visited May 16, 2006).

http://www.principal.com/bank/switchkit/conv_payment_transfer.htm, Automatic Payment Transfer Letter, website (last visited May 16, 2006).

http://en.wikipedia.org/wiki/Screen_scraping, Screen Scraping, website, (last visited May 16, 2006).

http://www.poorva.com/aie/?Google_ScreenScraping.shtml, Advanced Information Extractor, website (last visited Aug. 17, 2005).

http://www.poorva.com/aie/aie_edgar.shtml, Advanced Information Extractor website (last visited Aug. 17, 2005).

http://www.scrapegoat.com/services.php, Scrape Goat, LLC webiste (last visited Aug. 17, 2005).

http://www.scrapegoat.com/faqs.php, Scrape Goat, LLC website (last visited Aug. 17, 2006).

Extended European Supplementary Search Report.

XP007905525, pp. 592-593, Nov. 1, 2007.

\* cited by examiner

SYSTEM AND METHOD OF TRANSFERRING INFORMATION

CLAIM OF PRIORITY

This application claims priority under 35 U.S.C. 119(e) to U.S. Provisional Application No. 60/719,581, filed Sep. 23, 2005.

TECHNICAL FIELD

The invention relates to a system and method of transferring information.

BACKGROUND

There can be inefficiencies in the transfer of information from one storage location to another storage location, for example, when the information is performing a function at a first storage location and it is inconvenient to introduce the information to a second storage location. It is typical for an individual's information, such as account information, to facilitate a function while stored in a database. For example, information stored on a bank's servers can function to automatically pay the individual's bills. In this example, an individual who wishes to change banks may nonetheless choose to remain at their first bank because of difficulties or inconveniences related to re-providing the information to the second bank's servers. An individual who wishes to retain automatic bill payment functionality can be faced with a choice between proceeding with the onerous transfer of information, maintaining an account at each bank, or forgoing the switch to the preferred bank altogether. Re-entry of information can be a time-consuming task, and can deter the transfer of information to another location.

For example, to implement automatic bill payment at a second location, one typically must search for and search through paper files or collect information from a computer screen. Deterrence caused by lack of convenience can exist even though the transfer of information might be desirable or potentially beneficial. In the case where a bank, or any other organization, wishes to attract new customers, the organization typically must offer the potential customers a benefit as an incentive to move their account. Such benefits traditionally come only at a cost to the organization. If some of the organization's potential customers are hesitant to make the move because of inconveniences associated with transferring account information to the organization, then the organization will likely be forced to increase the offered benefit and, thus, their cost will also increase.

Financial institutions, themselves, will typically balk at exploiting automation technology even though doing so can improve efficiency or reduce certain costs of doing business. In some cases, this apprehension can be a reflection of an unwillingness to perform an onerous information transfer even though doing so could yield an increase in profit or efficiency. In some cases, the inefficiencies and costs that can accompany an onerous information transfer becomes more pronounced; such cases serve to highlight the need for a better solution than those currently available. For example, wealthy customers, such as large organizations or wealthy individuals, tend to have more information stored at a financial institution, for example, a bank. In addition, wealthy customers are more likely to have the information performing one or more functions, for example, automatic bill payment. As a result, inefficiencies in transferring the information tend to become increasingly amplified as the wealth of the customer increases.

For example, the probability that the customer will experience increased delay, increased costs, and increased risk of interruption of the function, in this example automatic bill payment, increases with the wealth of the customer. Each of the above factors, in addition to the onerous nature of the transfer it self, can deter the customer from establishing a new account at a second bank. The problem is again compounded because banks typically prefer wealthy customers and wealthy customers are most likely to forego establishing a new, or even preferable, account at another bank because of onerous information transfers. Banks can offer larger incentives, but larger incentives usually come at a larger cost. As an alternative to increasing incentives, banks have begun recognizing the need for efficient systems and methods of transferring information.

SUMMARY

In general, a method and system of transferring information includes accessing a first database with an access parameter and communicating the information to a second database.

In one aspect, a system of transferring information includes an input module configured to receive an access parameter from an entity authorized to provide the access parameter, an access module configured to access a first database or a second database and communicate information from the first database to the second database. The information is configured to perform an authorized function. The function can be authorized bill payment. The information to be transferred can include financial information. In some circumstances, the information can include account information.

The system can also include a collection module that may be configured to collect the information from the first database. The system can also include a processor. In some embodiments, the processor is configured to direct, coordinate, or instruct one or more modules. The system can also include a filter module. The filter module can be configured to transfer limited information. In some embodiments, the filter module limits the information communicated to the second database by sorting the accessed or collected information. The filter module can sort the information by separating the information into one or more categories, for example, the filter module can separate and withhold from transfer information that will not be used once the information is transferred to the second database.

The processor may include software-coded instructions, hardware-coded instructions or a combination of both software-coded instructions and hardware-coded instructions. The input module, access module, collection module, filter module, and communication module can include software-coded instructions, hardware-coded instructions or a combination of both software-coded instructions and hardware-coded instructions. Similarly, each of the first database and the second database, individually, can be configured to store the information in electronic form. The access parameter can include, for example, security data or user identification data that permits access to each of the first database and the second database, individually. For example, the access parameter can also provide access to the second database. The access parameter can be provided by the owner of the information to be transferred by the system. The owner of the information can provide the access parameter either directly to the input module or through one or more surrogates authorized to provide the access to the input module on behalf of the owner.

Another aspect of the system includes a computerized system for transferring information and includes access parameter receiving fields, an access module configured to electronically access the information with the access parameter, and a processor configured to automatically supply the information to a storage device wherein the storage device is configured to electronically store the information and the information is configured to perform an authorized function.

In one embodiment, the system can include a processor that can include a collection module configured to automatically collect the information. The processor can also include a communication module configured to supply the information to the storage device. The processor can also include a filter module configured to transfer limited information or an implementation module configured to employ the information to perform the authorized function.

In another aspect, a method of transferring information includes an authorized entity providing an access parameter to an input device configured to receive the access parameter, accessing a first database with the access parameter, communicating information from the first database to a second database, and implementing the information in the second database.

A method of transferring information can include providing an access parameter to an input module. The input module can then communicate the access parameter to one of several devices, including a processor or an access module. Information can be stored in a first database. The access module can use the access parameter to access information in a first database. In some embodiments, the first database can be accessed without utilizing the access module. In an example that includes the access module, the access module can retrieve the information and transfer it to a second database. This transfer can be done directly by the access module or indirectly through any combination of modules that results in the transfer of information to the second database so that the information can be implemented so as to perform an authorized function. Some embodiments provide an implementation module for implementing the information so as to help perform a function while the information is stored in the second database.

Once the information has been retrieved from the first database, the information can be subject to various forms of processing. Examples of such processing include collecting the information through utilization of, for example, a collection module, or filtering the information through, for example, a filter module.

Filtering can include filtering based on data content. Data content filtering can, for example, remove data that is irrelevant to the functions to be performed after the information is transferred to the second database. Filtering can also include filtering by amount of data, time of entry of data, location of data. In another example, filtering by data content can include filtering out all relevant data. For example, when the security of the information is a concern, it can be desirable to retrieve the information, filter all relevant, harmful data from transfer. For example, filtering can include determining which information is sensitive and encrypting that information for safe transfer.

In other embodiments, the method can include implementing the information at the second database so that the information can be used in the performance of a function. The information can be implemented so as to perform substantially the same function it did prior to transfer. Implementing the information can also include permissibly altering the function performed by the information to a new authorized function. Implementation can also include a communication module for communicating the implementation instructions to the second database. Communicating can be through the use of writing, wired connection, face-to-face communication, wireless communication, and any and all other known forms of conveying information from one device, person, document, or organization to another device, person, document, or organization. Examples of wireless communication are radio frequency, infrared, or other wave-length based forms of signal transfer such as Bluetooth transmission and detection, satellite transmission and detection, photonic transmission and detection, and any and all other known forms of wireless signal transmission and detection of signals configured to carry information, for example, voice information, data information.

The method can also include increasing the efficiency of the information transfer, for example, by utilizing a processor. Facilitating can include directing one or more modules to act in a certain way, or at a certain time, or only on certain information. Facilitating can also include coordinating activity, or idle states, between a plurality of modules. Facilitating can be electronic, for example, facilitating can be computerized. Facilitating can also be non-electronic. Another example of a non-electronic processor can include a natural person directing or coordinating the transferring, implementing, or other manipulating of the information.

The method can include utilizing the information for performing an authorized function at the second database. Examples of the information that can be transferred by the method are financial information, account information, medical information, pharmaceutical monitoring information, and criminal background and monitoring information.

The method also can include transferring the information with the authorization of the owner of the information. For example, the method of transferring the information can include transferring an account holder owner's bank account information, and other information that is used at the first database for automatic bill payment to a second database, with the authorization of the account holder owner, and implementing the information to perform the automatic bill payment function while stored at the second database.

In another aspect, a method for transferring information includes storing information in at least one initial storage location, permissibly retrieving the information from the initial storage location, supplying the information to a separate storage location; and implementing the information at the separate location. The method can include storing the information electronically or non-electronically in each of the initial storage location or the separate storage location, independently.

For example, a bank account holder whose account is set up to pay one or more bills automatically often would rather remain at their current bank after learning that another bank is more desirable simply because they lack the desire to re-provide all of the relevant data. In the case of automatic bill payments, this can include the arduous task of searching through forgotten files and archives and then, if found, collecting and inputting all of the information. Solutions to this problem include systems and methods of transfer that still include the account owner collecting all of the necessary information, bank account or otherwise.

Systems and methods fof automating the collection and transfer of information exist in the art but the majority of such data collection, or "data scraping", includes collecting and transferring information without the authorization of the owner of the information. Other automated systems and methods exist where there is proper authorization, but they fail to address the problem because transferring bank account information does not implement functionality at a second location based on that information. In addressing the transfer of information to implement automatic bill payment functionality, banks have recently employed paper "switch-kits." Billpay switch-kits amount to little more than a preconfigured form that still requires the owner of the information to hunt for, collect, and provide the information.

Advantageously, the system and method can enable a second database to obtain access to information by accepting an access parameter that allows authorized entry into a first database where the information can be collected without the assistance of the owner of the information. The information, once accessed, can also be transferred and implemented at a second database with minimal involvement from the owner of the information.

The details of one or more embodiments are set forth in the accompanying drawings and in the descriptions below. Other features, objects, and advantages will be apparent from the drawings, from the descriptions, and from the claims.

DETAILED DESCRIPTION

Figure 1:
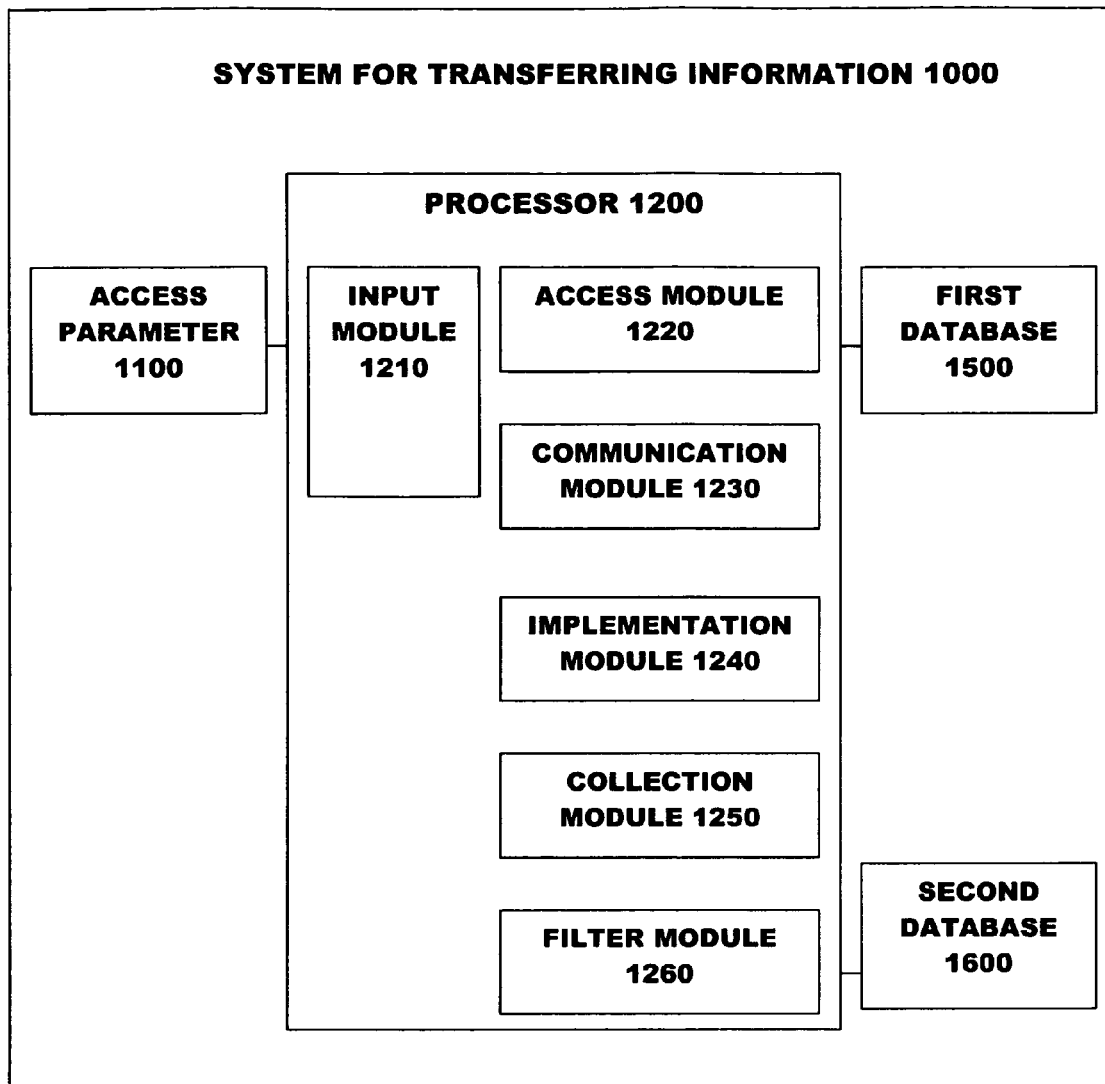
FIG. 1 is a drawing depicting a system of transferring information.

The systems and methods can be used to transfer information from one location to another location. For example, the information can be stored electronically, magnetically, optically, on paper, or through any medium capable of holding data. The information can be electronically stored using an optical storage medium, a magnetic storage medium, a temporary electronic storage medium such as random access memory (RAM), microcircuitry, and other electronic media. Examples of electronic media for storing information are flash disk drives, magnetic disk drives, optical disk drives, magnetic tapes, and any surface into or upon which information can be etched, or soldered. The information can also be stored optically, for example, in holographic media. Non-electronic information storage is a well known form of storage and includes such traditional devices as paper and human memory. It is not necessary for the information to be confined to one storage location. A system and method for transferring information can access one or more initial databases for transferring the information to a second database. A database can be electronic, such as a computerized server, or non-electronic such as printed on paper.

In some embodiments, the information assists in the execution of one or more functions, for example, automatic bill payment. Such an embodiment can include a system or method of transferring a bank customer's account information from a first database to a second database separately located, for example, at a second bank. While stored in the first database and the first bank, the information in this embodiment can be used for automatic bill payment. After permissibly accessing the first database, system or method can then transfer the information to the second database at the second bank. The system and method in this embodiment can then implement automatic bill payment functionality, or other functionality, that utilizes the information transferred. The function can be any task that includes the authorized use of the information.

Authorization can take many forms and reflects the knowing consent and permission from the owner of the information, either directly or through one or more surrogates acting on behalf of, or at the behest of, the owner of the information. For example, authorization can be introduced to the systems and methods when an access parameter is permissibly introduced. In general, the information contained in a first database will require entry of one or more access parameters. This and other embodiments include an owner of information that knowingly inputs or provides for input, an access parameter that can be used to authorize access to the owner's information. After knowingly providing authorization, there exist embodiments that need not include any additional involvement from the owner of the information. In an embodiment configured to transfer information automatically, the burden on the owner of the information throughout the information transfer might only include providing an access parameter configured to provide access to the first database. In such an embodiment, the bulk of the transfer can be automated, for example, through the use of computer or one or more natural persons. For example, a bank can have one or more personnel perform the transfer with or without the assistance of a computer. Accordingly, there are embodiments where both computers and natural persons are used to receive the access parameter and use the access parameter to transfer the information from a first database to a second database.

Authorized access to the information in the first database can be ensured when the entity that owns the information be transferred provides the access parameters necessary for proper, safe, authorized access to the information at the first database. An access parameter can be provided by the owner of the information, or an authorized surrogate for locating the correct information at the first location. For example, an access parameter that is a user name will allow for the retrieval of the information corresponding to the owner of the user name. The information can be protected from unauthorized retrieval by any form of security technology. The owner of the information, in possession of the parameters for accessing the information in the initial storage location can also provide one or more access parameters that authorize the traversal of a security system guarding the information stored in the first database. Examples of access parameters that can traverse such security are a password that can be alphanumeric, fingerprint data, retinal data, biometric data such as DNA recognition, or any other information capable of hindering unauthorized access to the information.

The access parameters can be introduced through an input module. An input module can be anything capable of receiving the access parameter from the owner of the information or the owner's authorized surrogate. An authorized surrogate can be a natural person, organization, device, or document, for example, a will. Examples of an input device are a keyboard, mouse, wired transmission, wireless transmission, or any medium capable of storing an access parameter for retrieval by an input module. In some embodiments, the input module can include properly configured ports, antennas, scanners, or other device configured to receive the access parameter.

Once the access parameter, or other form of authorization, is obtained and the information in the first database is accessible, there are certain circumstances where the information can be implemented at the second database to perform substantially the same function it performed at the first database. There are other examples where the information can perform a different function that performed at the first database. In another example, it is not necessary for all of the information to be transferred to the second database. In such examples, a filter module can be used to sort the information by separating unwanted information from the information that is desired to be stored at the second database.

The information can be implemented at the second location to perform an authorized function. For example, an authorized function can be implemented by the system and method include automatic payment at a second location by transferring information that can implement the automatic payment of a banking customer's bills. In another example, the authorized function is storage at a second location of a patient's medical records after the patient's medical information is transferred from one location to the second location, for example the patient's new doctor's office. Other authorized functions can include monitoring pharmaceutical usage based on medical and sales data transferred to a second location and providing better crime-fighting intelligence based on transfer of information between states or agencies.

Referring to FIG. 1, in a system 1000, an access parameter 1100, or plurality of access parameters, can be provided to processor 1200 and received by input module 1210. In certain circumstances, processor 1200 can direct one or more modules for a more efficient transfer of information. Processor 1200 can direct or coordinate interaction between one or more of input module 1210, access module 1220, communication module 1230, implementation module 1240, collection module 1250, and filter module 1260. Just as the system can include modules that are not reflected in FIG. 1, it is not required that all modules participate in the transfer of information.

In an example that utilizes all modules shown in FIG. 1, an account owner can provide access parameter 1100 that can include, for example, a user name and a password. Access parameter 1100 is provided to input module 1210. Input module 1210 is configured to receive access parameter 1100 and can then pass access parameters 1100 to access module 1220. Access module 1220 can then use access parameter 1100 to access first database 1500. In this example, collection module 1250 can retrieve the information from first database 1500. If desired, filter module 1260 can ensure that only certain information is communicated to second database 1600 by and can be configured to separate the unwanted information and block the unwanted information from being transferred to second database 1600. Communication module 1230 can be configured to transfer the information to database 1600 and implementation module 1240 can configure the information to perform a function authorized by the owner of the information. Communication module 1230 can include natural persons or a computer executing instructions and can be configured to communicated, for example, by wired connection, wireless connection, verbally, or through written word.

In another example, the information from first database 1500 can be transferred once access module 1220 accesses first database 1500 and processor 1200 instructs first database 1500 to transfer the information to second database 1600 using communication module 1230. In this example, not every module in FIG. 1 is utilized Processor 1200 and each module, individually, can be a set of coded instructions. The coded instructions can be software-coded or hardware-coded. However, processor 1200 and each module, individually, are not limited to electronic execution of instructions. For example, processor 1200 and each module, individually, can also be instructions executed by natural persons. Consistent with the preceding example, processor 1200 can be an employee at a financial institution.

Figure 2:
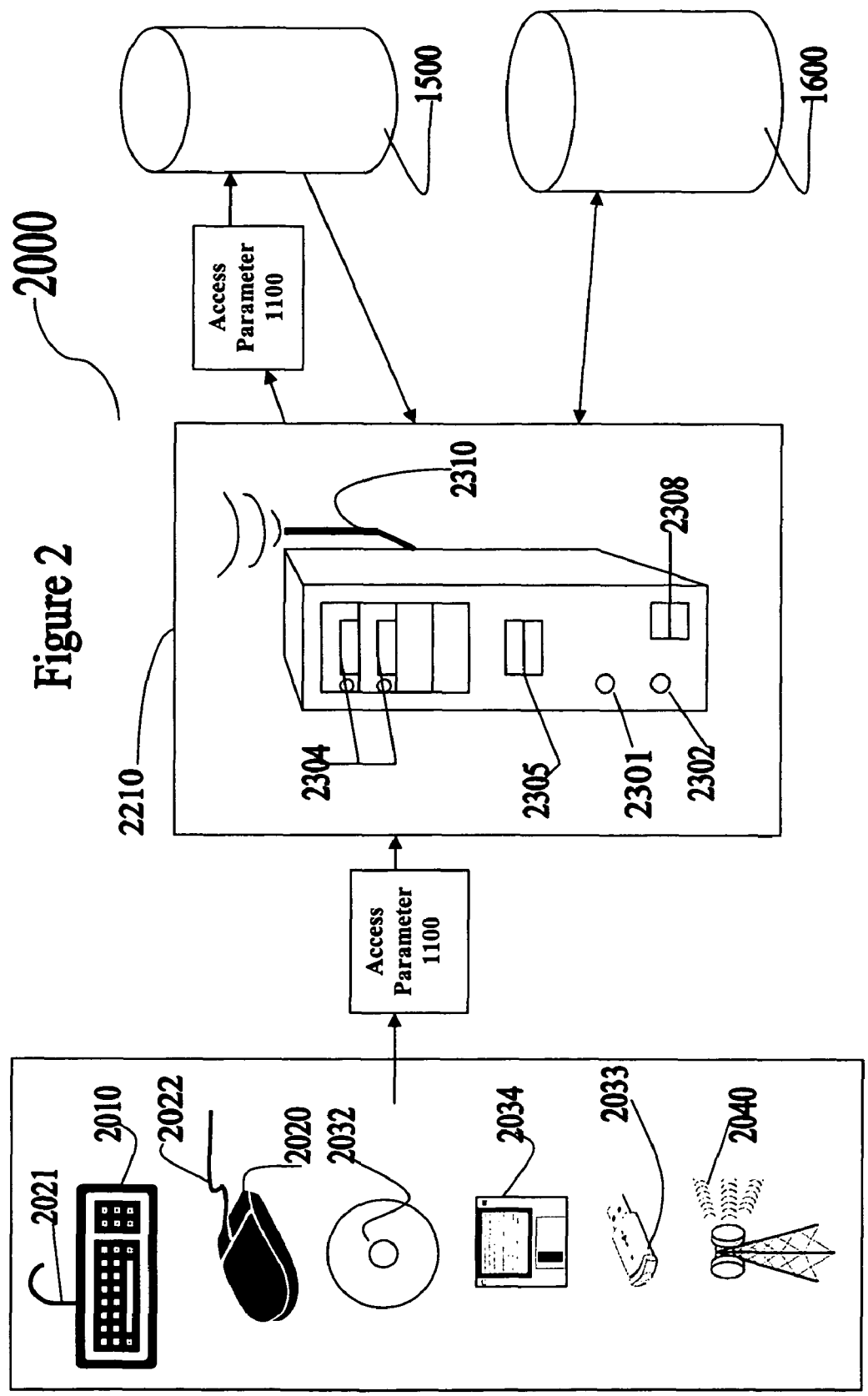
FIG. 2 is a drawing depicting examples of various components that can be used in a system of transferring information.

Referring to FIG. 2, a system 2000 for transferring information is depicted. System 2000 is an example of an embodiment where the processor is a computer 2210 configured to receive an access parameter from an input device. Keyboard 2010 is an example of an input device. Keyboard 2010 can be configured to transmit the access parameter to computer 2210 through a properly configured keyboard input port 2301 using a keyboard cable 2021 or by wireless transmission to receiving antenna 2310. Another example of an input device is mouse 2020. Mouse 2020 can be configured to transmit the access parameter to computer 2210 through a properly configured pointer input port 2302 using a mouse cable 2022 or by wireless transmission to receiving antenna 2310. The access parameter can also be electronically transferred to computer 2210 by other means. For example, electronic transfer can include transfer to computer 2210 from a storage device. Examples of storage devices can include optical media 2032, flash media 2033, and magnetic media 2034. Computer 2210 can receive the access parameter in many ways. For example, drive bay 2304 can be configured to receive input from optical storage media 2032 such as a Compact Disk or Digital Video Disk. In addition, drive bay 2305 can be configured to receive input from magnetic media 2034 such as a floppy disk. Serial port 2308 is another device through which computer 2210 can receive the access parameter. Serial port 2308 can be configured to receive input from, for example, flash storage media 2033. In general, however, an input device is any device configured to store the access parameter so that computer 2210 can receive the access parameter. For example, the data transfer can also be wireless, for example by use of a wireless transmitter 2040. Examples of a wireless transmitter include satellites, radio frequency emitters, Bluetooth emitters, cellular telephones, handheld computing devices, laptop computing devices, or any device capable of emitting a data-carrying signal configured to be received by antenna 2310. The access parameter can also be input vocally or through document scanning means.

Computer 2210 can then use the access parameter to access first database 1100 and retrieve the information. Computer 2210 can communicate with first database 1500 and second database 1600 through a wired connection or wirelessly. In an embodiment where the processor is an organization or instructions executed by natural persons, communication can also take place verbally or through written word.

The processor can also be a natural person. In general, the processor is any device, organization, natural person, or any other mechanism that is configured to accept input directly or indirectly and coordinate the execution of instructions either alone or in conjunction with one or more additional processors or one or more modules, to use an access parameter to gain access to a first database and transfer information from the first database to a second database. An example of a processor indirectly executing an instruction is by use of an input module to receive the access parameter. In other embodiments, the processor can use one or more modules, or even another processor.

Figure 3:
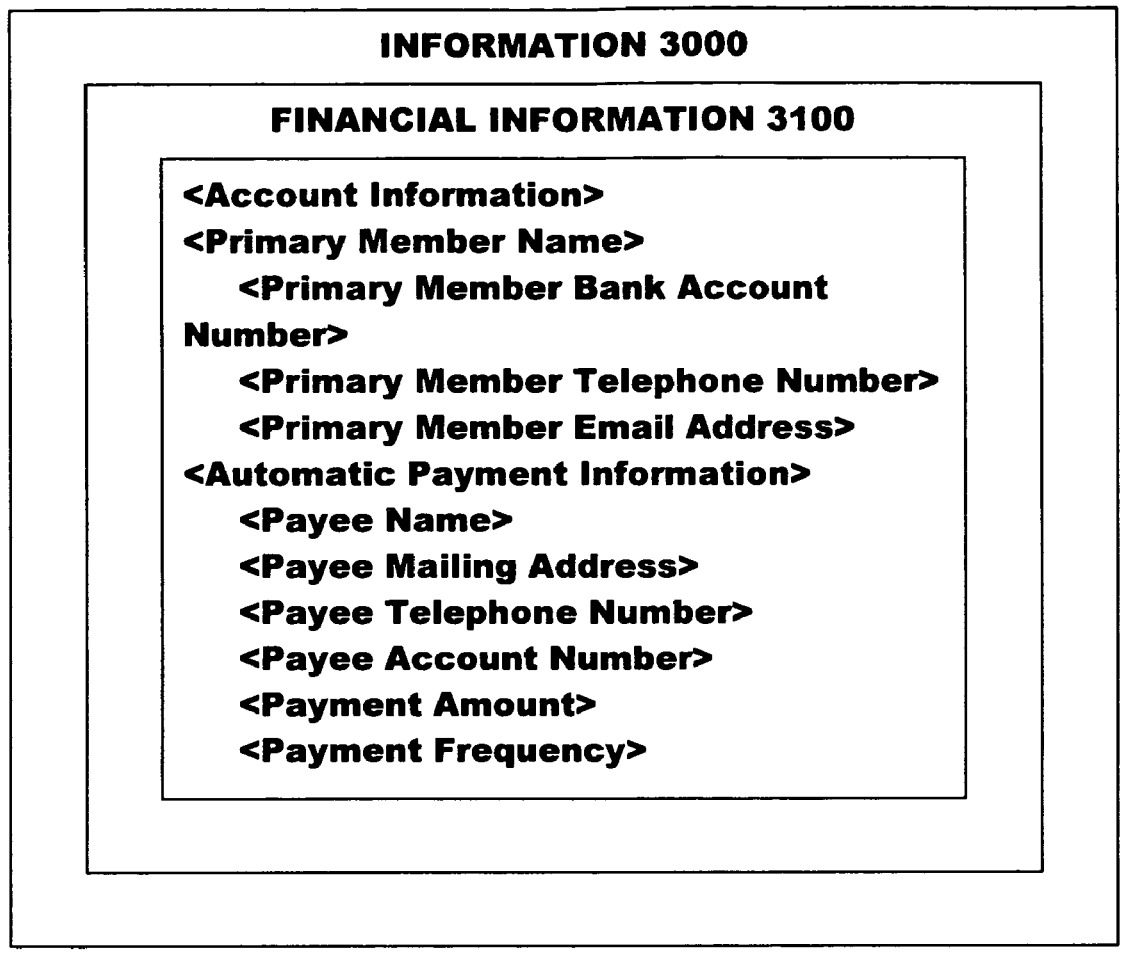
FIG. 3 is a drawing depicting an example of financial information that can be transferred.

Referring now to FIG. 3, information 3000 includes any information that can be permissibly transferred from one location to a second location for authorized use at the second location. In one embodiment, information 3000 is transferred in a convenient manner. For example, an information transfer can lessen the involvement of the information owner, or can even remove the owner's involvement altogether after the owner has provided a proper access parameter 1100. For example, FIG. 3 provides an example where information 3000 is financial information 3100. FIG. 3 shows financial information 3100 that includes the owner's account information and some additional information that can assist in the automatic payment of the owner's bills. Financial information can include the owner's primary member name, bank account number, telephone number, or E-mail address. In an example that includes the information functioning to automatically pay the owner's bills, information 3100 can also include the owner's automatic payment information. For example, information 3100 can include payee name, payee mailing address, payee telephone number, payee account number, payment amount, or payment frequency.

The system and method for transferring information can also involve the transfer of medical information, in which the owner of medical information pre-provides an access parameter to allow access to the owner's medical records by such institutions as an emergency care provider to perform the function of assisting a health care provider attend to the owner. In another example, medical information can be transferred to a second doctor's office for storage and recording therein. This system and method can have the benefit of bypassing the wait that can accompany the transfer of medical records to a new health care provider for the original health care provider to send the records. Examples of medical information are patient name, patient address, patient telephone number, patient E-mail address, patient insurance carrier, patient insurance policy number, patient's primary care physician's name, address, or telephone number, as well as information relating to the patient's medical status.

The information can also include pharmaceutical monitoring information, which can function to monitor a range of statistics such as sales data, marketing data, and usage data that can help determine whether there exists misuse of the monitored pharmaceutical or misuse by one or more pharmaceutical patients. Examples of pharmaceutical monitoring information are monitored drug name, indication, and dosage; sales data, such as region, state, and pharmacy; and purchaser monitoring data, such as patient name, address, telephone number, or age, as well as pharmacy data such as pharmacy name, address, dosage or refill frequency.

Similarly, the information can include criminal background information, which can include monitoring of known sex offenders, collecting crime statistics, and locating a missing criminal. Examples of criminal background or monitoring information can include name, physical descriptive qualities such as age, height, weight, hair, eye, and race; as well as the criminal's last known address, the offense, other convictions, sentencing data, outstanding warrants, parole office name, or state, city, county, or any other information as to the criminal's whereabouts.

A method of transferring information can include providing an access parameter to an input module. The input module can then communicate the access parameter to one of several devices, including a processor or an access module. Information can be stored in a first database. The access module can use the access parameter to access information in a first database. In some embodiments, the first database can be accessed by without the utilizing the access module. In an example that includes the access module, the access module can retrieve the information and transfer it to a second database. This transfer can be done directly by the access module or indirectly through any combination of modules that results in the transfer of information to the second database so that the information can be implemented to perform an authorized function, as described above. Some embodiments provide an implementation module configured to employ the information to perform the authorized function.

Once the information has been retrieved from the first database, the information can be subject to various forms of processing. Examples of such processing include collecting the information through utilization of, for example, a collection module. The information can be filtered by, for example, a filter module.

Filtering can include filtering based on data content. Data content filtering can, for example, remove data that is irrelevant to the functions to be performed after the information is transferred to the second database. Filtering can also include filtering by amount of data, time of entry of data, location of data. For example, filtering by data content can include filtering out all relevant data. For example, when the security of the information is a concern, it can be desirable to retrieve the information, filter all relevant, harmful data from transfer. For example, filtering can include determining which information is sensitive and encrypting that information for safe transfer.

In other embodiments, the information is implemented so as to assist in the performance of a function while the information is stored in a second database. The information can be implemented so as to perform substantially the same function it did prior to transfer. Implementing the information can also include permissibly altering the function performed by the information to a new authorized function. In addition, implementing the information can include communicating the implementation instructions to the second database. Communicating can be through the use of writing, wired connection, face-to-face communication, wireless communication, and any and all other known forms of conveying information from one device, person, document, or organization to another device, person, document, or organization. Examples of wireless communication are radio frequency, infrared, or other wave-length based forms of signal transfer such as Bluetooth transmission and detection, satellite transmission and detection, photonic transmission and detection, and any and all other known forms of wireless signal transmission and detection of signals configured to carry information, for example, voice information, data information.

The method can also include increasing the efficiency of the information transfer, for example, by utilizing a processor. Facilitating can include directing one or more modules to act in a certain way, or at a certain time, or only on certain information. Facilitating can also include coordinating activity, or idle states, between a plurality of modules. Facilitating can be electronic, for example, facilitating can be computerized. Facilitating can also be non-electronic. Another example of a non-electronic processor is a natural person directing or coordinating the transferring, implementing, or other manipulating of the information.

The embodiments described above are offered by way of illustration and example. It should be understood that the examples provided above may be altered in certain respects and still remain within the scope of the claims. For example, an embodiment of the system and method disclosed herein can fall within the scope of the claims even though the access parameter is neither information-locating, such as a user name, nor security-traversing, such as a password. In an embodiment where the information is inherently identifiable and no security protection is present, it is conceivable and, indeed, intended to be within the scope of the invention that in its broadest sense the access parameter can be a simple address, real or electronic, telephone number, or a single keystroke. Any access parameter used to retrieve the information from the first information storage location with authorization falls within the scope of the claims, such as the previously undisclosed embodiment just provided. It should be appreciated that, while the invention has been described with reference to the above preferred embodiments, other embodiments are within the scope of the claims.

What is claimed is:

1. A system of transferring information comprising:

an input module configured to receive an access parameter from an entity authorized to provide the access parameter including the owner of information or one or more authorized surrogate, the authorized surrogate acting on behalf of or at the behest of the owner of the information, wherein the information is stored electronically or magnetically on a medium capable of holding data including an optical storage medium, a magnetic storage medium, a temporary electronic storage medium, or microcircuitry, the access parameter capable of being input directly to the input module or through surrogates authorized to provide access to the input module, the access parameter configured to locate specific stored information at a first database, and the access parameter configured to traverse a security system guarding the stored information in the first database, wherein the input module includes a device capable of storing an access parameter for retrieval including a keyboard, mouse, wired transmission, wireless transmission, or other medium, and wherein the input module includes a device configured to receive the access parameter for retrieval including a configured port, antenna, scanner, or other device;

an access module on a computer configured to electronically access the first database with the access parameter and communicate the stored information from the first database to a second database by a communication module, the communication module configured to increase efficiency of information transfer of to the second database by coordinating the activity or idle states between a plurality of modules, the transfer converting stored information to communicated information, wherein the communicated information is configured to perform an authorized function, the function being a task that requires authorized use of the communicated information, and the communication module configured to transfer information from the first database to the second database using a wired connection, or wireless connection;

a collection module configured to permissibly collect based on the access parameter the communicated information from the first database or the second database, and wherein the collection module is configured to store the communicated information for future performance of the authorized function, wherein the authorized function reflects the consent and/or knowledge of the of the owner of the communicated information, either directly or indirectly through one or more authorized surrogate, the authorized surrogate acting on behalf of or at the behest of the owner of the information, and wherein the authorized function utilizes the communicated information, and wherein the communicated information is implemented at the second database to perform substantially the same function that it performed at the first database and a filter module configured to transfer limited communicated information by sorting the communicated information by separating the communicated information into one or more categories, and the filter module filtering based on data content including amount of data, time of entry of data, location of data, removal of data that is irrelevant to the functions to be performed after the communicated information is transferred to the second database, or withholding from transfer any information that will not be used once the communicated information is transferred to the second database.

2. The system of claim 1 further comprising a processor.

3. The system of claim 2 wherein the processor directs or coordinates one or more modules.

4. The system of claim 1 wherein the collection module is configured to collect information from the first database.

5. The system of claim 4 wherein the collection module includes software-coded instructions.

6. The system of claim 4 wherein the collection module includes hardware-coded instructions.

7. The system of claim 1 wherein each of the first database or the second database, independently, is configured to store information in electronic form.

8. The system of claim 1 wherein the access module includes software-coded instructions.

9. The system of claim 1 wherein the access module includes hardware-coded instructions.

10. The system of claim 1 wherein the communication module includes software-coded instructions.

11. The system of claim 1 wherein the communication module includes hardware-coded instructions.

12. The system of claim 1 wherein the access parameter includes security data or user identification data that permits access to each of the first database or the second database, individually.

13. The system of claim 1 wherein the information includes account information.

14. The system of claim 1 wherein the access parameter is provided by the owner of the information to be transferred by the system.

15. A method of transferring information comprising:

receiving an access parameter from an authorized entity with an input module, the access parameter capable of being input directly to the input module or through surrogates authorized to provide access to the input module, the input module configured to receive an access parameter from an entity authorized to provide the access parameter including the owner of information or one or more authorized surrogate, the authorized surrogate acting on behalf of or at the behest of the owner of the information, wherein the information is stored electronically or magnetically on a medium capable of holding data including an optical storage medium, a magnetic storage medium, a temporary electronic storage medium, or microcircuitry;

accessing a first database electronically on a computer with the access parameter through an access module, the access parameter configured to locate specific stored information at the first database, and the access parameter configured to traverse a security system guarding the stored information in the first database, and the access parameter configured to traverse a security system guarding the stored information in the first database, wherein the input module includes a device capable of storing an access parameter for retrieval including a keyboard, mouse, wired transmission, wireless transmission, or other medium, and wherein the input module includes a device configured to receive the access parameter for retrieval including a configured port, antenna, scanner, or other device;

collecting stored information from the first database;

communicating stored information from the first database to a second database through the access module;

using a communication module configured to increase efficiency of information transfer to the second database by coordinating the activity or idle states between a plurality of modules, the transfer converting stored information to communicated information;

using a filter module configured to transfer limited communicated information by sorting the communicated information by separating the communicated information into one or more categories, and the filter module filtering based on data content including amount of data, time of entry of data, location of data, removal of data that is irrelevant to the functions to be performed after the communicated information is transferred to the second database, or withholding from transfer any information that will not be used once the communicated information is transferred to the second database; and implementing the communicated information in the second database through the access module wherein the communicated information is implemented at the second database to perform substantially the same function that it performed at the first database.

16. The method of claim 15 wherein the implementing includes configuring the information to perform an authorized function.

17. The method of claim 15 wherein collecting the information includes executing coded instructions.

18. The method of claim 15 wherein filtering the information includes executing coded instructions.

19. The method of claim 15 further comprising electronically storing the information in a database.

20. The method of claim 15 wherein accessing the first database includes executing coded instructions.

21. The method of claim 15 wherein communicating information from the first database to the second database includes executing coded instructions.

22. The method of claim 15 wherein the receiving the access parameter includes receiving security data or user identification data for accessing the first database or the second database.

23. The method of claim 15 wherein the information includes financial information.

24. The method of claim 15 wherein the information includes account information.

25. The method of claim 15 further comprising authorizing the transferring of information, wherein an owner of the information knowingly authorizes the receiving, accessing, and communicating.

26. The method of claim 25 wherein the authorized entity is the owner of the information.

27. The method of claim 15 wherein the implementing the information in the second database includes paying an account holder's bills.

28. The method of claim 15, wherein implementing the communicated information in the second database includes using the communicated information in the second database to perform an authorized function wherein the authorized function utilizes the communicated information.

* * * * *